United States Patent [19]
Adams

[11] Patent Number: 5,417,454
[45] Date of Patent: May 23, 1995

[54] FRAME REINFORCEMENT MEANS

[76] Inventor: Keith Adams, 114 S. Lansdowne Avenue, Sarnia, Ontario, N7S 1G6, Canada

[21] Appl. No.: 218,722

[22] Filed: Mar. 28, 1994

[51] Int. Cl.⁶ .............................................. B62D 21/06
[52] U.S. Cl. ..................................... 280/794; 280/793
[58] Field of Search ............... 280/794, 793, 784, 781; 180/69.2, 295, 311; 267/66; 296/188, 205, 204

[56] References Cited

U.S. PATENT DOCUMENTS

| | | | |
|---|---|---|---|
| 2,108,279 | 2/1938 | Wheat | 280/794 |
| 2,113,540 | 4/1938 | Maddock | 280/294 |
| 2,820,645 | 1/1958 | Schilberg | 280/794 |
| 3,499,661 | 3/1970 | Rowe, Jr. | 280/794 |
| 4,258,820 | 3/1981 | Miura et al. | 180/295 |
| 4,327,938 | 5/1982 | Geissler et al. | 280/794 |

FOREIGN PATENT DOCUMENTS 1103571  6/1981  Canada .

*Primary Examiner*—Margaret A. Focarino
*Assistant Examiner*—Christopher P. Ellis

[57] ABSTRACT

A device is disclosed for assisting in maintaining the structural rigidity of an automobile frame. It comprises a beam member having spaced apart ends each of which is adapted for attachment to a frame rail of a selected automobile frame at the point of attachment of a lower control arm strut of the automobile. The beam member serves to rigidly connect together the frame rails of the right and left sides of the automobile and maintain them in a predetermined rigid spaced apart relationship.

12 Claims, 2 Drawing Sheets

FRAME REINFORCEMENT MEANS

BACKGROUND OF INVENTION

The present invention relates to the field of automobile parts and equipment. In particular, the present invention provides a novel frame support device for attachment to the frame of an automobile to strengthen same.

In certain models of automobiles, it has been observed that the frame in the front end region of the automobile tends to vibrate at high speeds, such as speeds in excess of 100 km/hr and there is a tendency for harmonic vibration to develop. While this does not present a safety hazard, it is a substantial annoyance to the driver and passengers in the automobile. These vibrations are a direct result of the operation of the engine and transmission, and affect primarily small capacity automobiles with light duty frames. Typical examples of such automobiles are Tempo TM, Topaz, Escort, and EXP models of the Ford Motor Company. In these models, the vibrations tend to occur in the area of the frame rails and lower control arm struts.

Moreover, it has been observed, in car models of the class mentioned above that frame damage in the event of collision is difficult to repair, and often, it is substantially impossible to obtain acceptable structural integrity in the frame rails and lower control arm struts after repair has been effected. Furthermore, it will be understood that in the event of collision, repairs to frame members do not involve replacement of frame parts, but rather, frame parts are serviced by rebending, welding and the like. It is not uncommon for repaired frames to exhibit slightly different dimensions than they ought to, because of the problems inherent in repositioning damaged or bent steel beams.

SUMMARY OF INVENTION

In view of the foregoing, it is an object of the present invention to provide a device to assist in maintaining the structural rigidity of an automotive frame after it has been repaired. In this regard, it is an important object of the present invention to provide a device to span between the points of connection of the lower control arm struts of an automobile to the frame thereof, to maintain the original intended dimension of the automobile frame members.

It is a further object of the present invention to provide a frame rigidizing structure for installation on automobiles to damp out vibrations in the frames of same and provide improved handling, especially concerning, characteristics for same.

In one broad aspect, the present invention relates to a device for assisting in maintaining the structural rigidity of an automobile frame, comprising a beam member having spaced apart ends each of which is adapted for attachment to a frame rail of a selected automobile frame at the point of attachment of a lower control arm strut of a said automobile, whereby said beam member serves to rigidly connect together the frame rails of the right and left sides of a said automobile and maintain them in a predetermined rigid spaced apart relationship.

BRIEF DESCRIPTION OF DRAWINGS

In drawings that illustrate the present invention by way of example.

DETAILED DESCRIPTION

Figure 1:
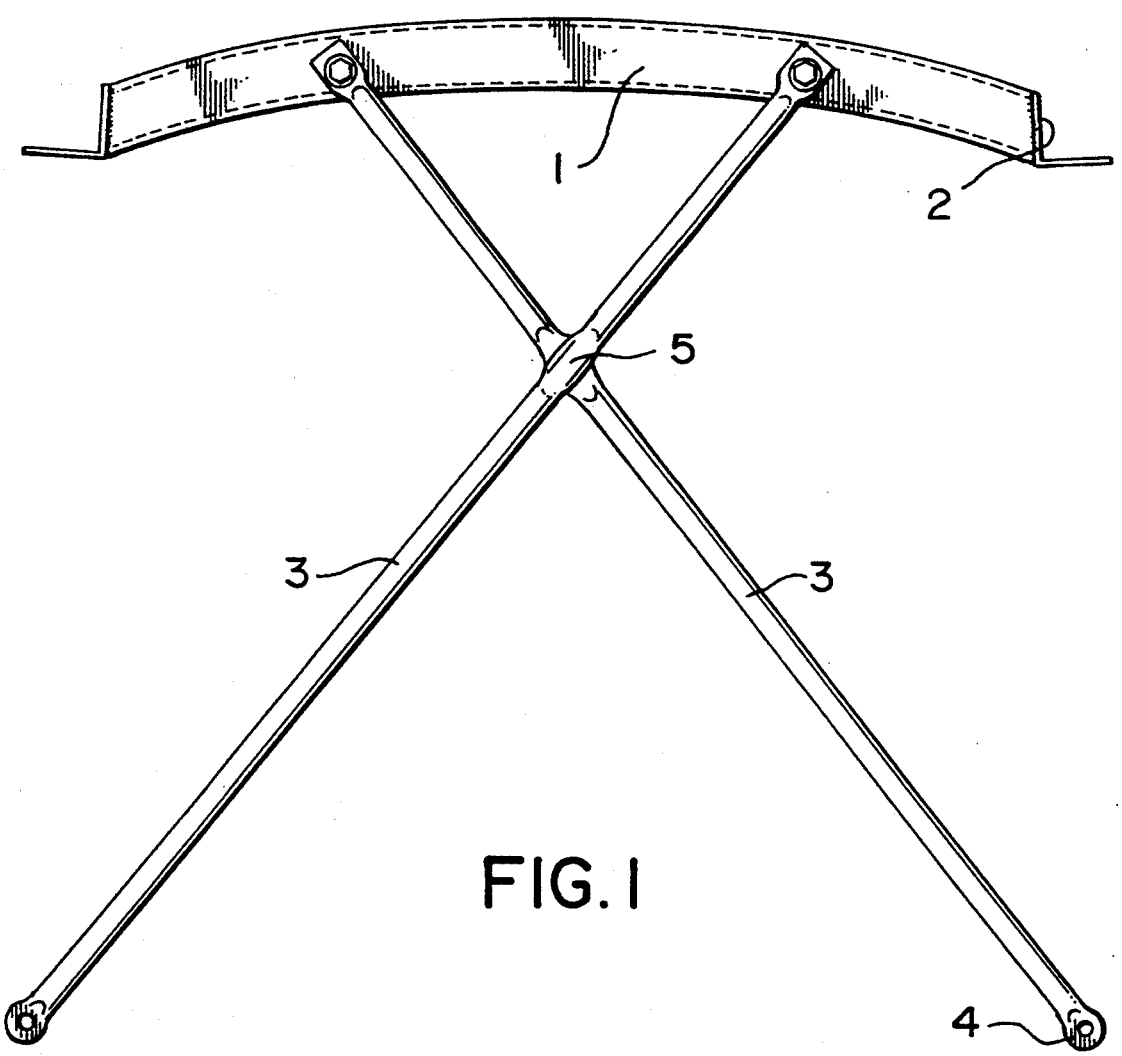
FIG. 1 is a plan view of a two part frame support device according to the present invention, designed and adapted for installation on a Ford TEMPO TM automobile.
Figure 2:
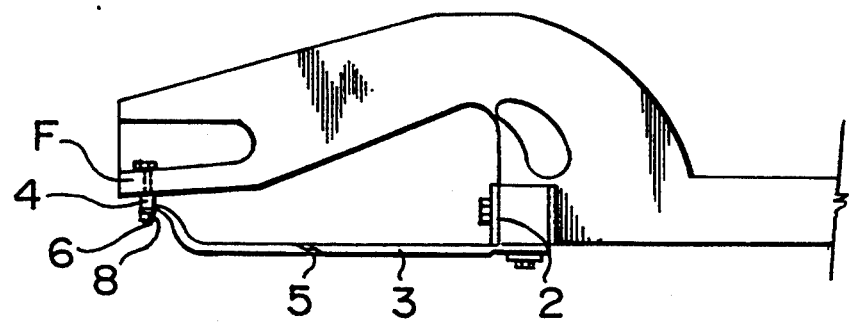
FIG. 2 is a side view thereof.
Figure 3:
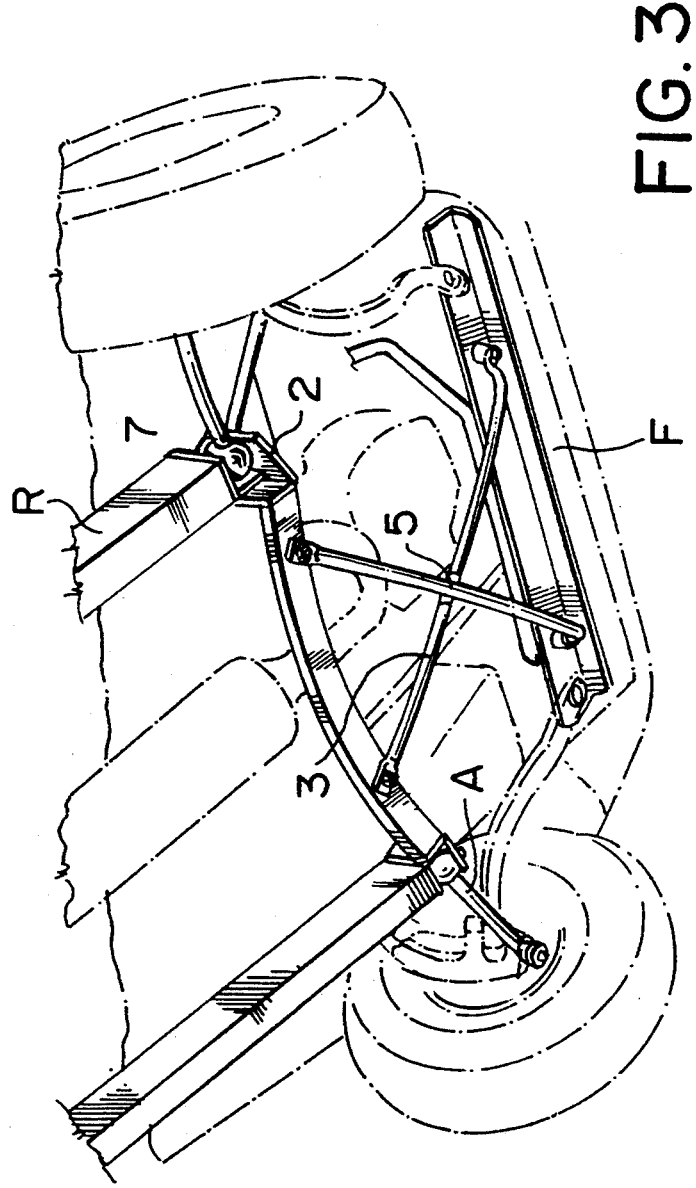
FIG. 3 is a perspective view thereof, installed, showing its spatial relationship and connections to automobile frame members.

Referring now to all of the drawings together, the present invention in its most basic form comprises a transverse beam member 1, which together with connector plates 2 is dimensioned lengthwise to fit between the lower control arm struts A of a selected vehicle. The beam 1 may be fabricated, as illustrated from a steel rectangular box beam, or from any other profile beam. As illustrated, the beam may be arced in a gentle curve to avoid any part that, in a particular model, may be between the lower control arm struts. In the embodiment illustrated, a Ford TEMPO TM model is shown, and the beam 1 is curved gently to avoid the intake connector flange of the catalytic convertor.

At each end of beam 1, a connector plate 2 is provided, welded thereto. As illustrated, connector plate 2 may be made from 90° angle profiled steel plate, but other configurations are possible, such as a straight flange extending from the end of beam 1, welded or bolted thereto. Plate 2 is adapted by means of an aperture formed therein to be bolted to the same bolt 7 as holds lower control arm strut A to the adjacent frame rail R. If necessary, this bolt 7 is replaced with a slightly longer bolt, to compensate for the added thickness of plate 2.

In the preferred embodiment of the present invention illustrated, an additional X-shaped brace 3 is provided, extending between transverse beam of the present invention, and the forwardmost transverse frame member F beneath the radiator. At the ends of the brace 3 are provided bushings 4, welded thereto. At the position of these bushings 4, transverse frame member 4 is drilled through for insertion of connecting bolts 6, that extend through the bushings 4, which are then held to the transverse frame member by suitable nuts 8. Alternatively, bolts 6 may be replaced by threaded studs welded to the transverse frame member.

X-shaped brace 3 is fabricated from steel tubes flattened and welded at their point of intersection 5. Where they meet transverse beam 1, the ends of the brace 3 are flattened and drilled through, as is the beam 1, for suitable bolts to hold the ends of the brace to the beam 1.

It will be seen from the example illustrated that the structure of the frame support and strengthening device of the present invention may be asymmetrical, depending on the available space in a particular model of automobile. Depending on available space, the device, especially the X-shaped brace 3 may be symmetrical from side to side, as will be the case for a device of the present invention to fit on a Ford ESCORT TM.

It will also be seen from the drawings that the device of the present invention, especially the X-shaped brace, functions additionally as a shield for the exposed lowermost components of the automobile. Since one of the functions of the present invention is to assist in stiffening the front end for increased handling performance in cornering, it is expected that rally enthusiasts will utilize the device of the present invention. In doing so, they will also be adding a significant degree of impact protection for the lower parts of the engine, such as the oil pan, and the transmission.

It is to be understood that the examples described above are not meant to limit the scope of the present invention. It is expected that numerous variants will be obvious to the person skilled in the automotive engineering art, without any departure from the spirit of the present invention. The appended claims, properly construed, form the only limitation upon the scope of the present invention.

I claim:

1. A device for assisting in maintaining the structural rigidity of an automobile frame, comprising a beam member having spaced apart ends each of which is attached to a frame rail of a selected automobile frame at the point of attachment of a lower control arm strut of said automobile, whereby said beam member serves to (1) rigidly connect together the frame rails of the right and left sides of said automobile, (2) maintain said frame rails in a predetermined rigid spaced apart relationship, and (3) effectively damp vibration in the area of the frame rails and lower control arm struts.

2. A device as described in claim 1, wherein said beam extends substantially parallel to the ground.

3. A device as described in claim 2, wherein said beam is arced slightly.

4. A device as described in claim 3, wherein said beam is attached to said frame rails by means of plates welded to the ends thereof and apertured to accept bolts for bolting said plates to said frame rails.

5. A device as described in claim 2, wherein said device further includes a forwardly extending brace member connected to said beam at at least one point and connected to a transversely extending frame member at the front of a said selected automobile.

6. A device as described in claim 5, wherein said brace member is X-shaped, and connected to said beam at two points, and adapted to be connected to a said transverse frame member at two points, by means of bolts.

7. A device as described in claim 6, wherein said X-shaped brace comprises a pair of intersecting tubular members, welded together at their point of intersection, and provided, at their forward extremities, with upwardly extending bushing members for boltable connection to a said transverse frame member of a selected automobile.

8. A device as described in claim 3, wherein said device further includes a forwardly extending brace member connected to said beam at at least one point and connected to a transversely extending frame member at the front of a said selected automobile.

9. A device as described in claim 4, wherein said device further includes a forwardly extending brace member connected to said beam at at least one point and connected to a transversely extending frame member at the front of a said selected automobile.

10. A device as described in claim 4, wherein each of said plates is a right angle steel plate.

11. A device as described in claim 1, wherein said frame is a light duty frame.

12. A device as described in claim 6, said device being effective to shield one or more lowermost components in the engine area of said automobile when said device is attached to said automobile.

* * * * *